(12) United States Patent
Narendra et al.

(10) Patent No.: US 8,504,506 B2
(45) Date of Patent: Aug. 6, 2013

(54) SYSTEMS AND METHODS FOR MODELING AND ANALYZING SOLUTION REQUIREMENTS AND ASSETS

(75) Inventors: Nanjangud C. Narendra, Bangalore (IN); Karthikeyan Ponnalagu, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/946,917

(22) Filed: Nov. 16, 2010

(65) Prior Publication Data

US 2012/0123986 A1   May 17, 2012

(51) Int. Cl.
G06F 17/00 (2006.01)
G06N 5/02 (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| 7,322,024 | B2* | 1/2008 | Carlson et al. ................ 717/120 |
| 7,328,282 | B2* | 2/2008 | Ganesan et al. ............... 709/246 |
| 7,844,739 | B2* | 11/2010 | Ganesan et al. ............... 709/246 |
| 8,195,489 | B2* | 6/2012 | Bhamidipaty et al. ....... 705/7.11 |
| 8,230,387 | B2* | 7/2012 | Srivastava et al. ............ 717/104 |
| 2008/0178147 | A1 | 7/2008 | Meliksetian et al. |
| 2008/0208670 | A1 | 8/2008 | Goldszmidt et al. |
| 2008/0313008 | A1 | 12/2008 | Lee et al. |

\* cited by examiner

*Primary Examiner* — Michael B Holmes
(74) *Attorney, Agent, or Firm* — Ference & Associates LLC

(57) ABSTRACT

Systems and associated methods for capturing and storing asset analysis details are described. Systems and methods provide for building a model of the particular asset requirement for a specific purpose and a model of the range of capabilities that a particular asset can provide. The mapping of these two models allows for the identification of the best asset for a particular solution requirement. An asset match may occur when an asset capability model whose functional and non-functional capabilities subsume the functional and non-functional requirements specified in the asset requirements model.

18 Claims, 3 Drawing Sheets

SYSTEMS AND METHODS FOR MODELING AND ANALYZING SOLUTION REQUIREMENTS AND ASSETS

BACKGROUND

For many businesses, a material percentage of software licensing and hardware maintenance charges are incurred for assets that are no longer in use. In addition, development methods such as component-based and feature-based design focus on the reuse of already available software assets for reducing development time and cost, and improving software quality and productivity. As such, software asset analysis during application development is a costly but mandated exercise.

BRIEF SUMMARY

Systems and associated methods for capturing and storing asset analysis details are described. Systems and methods provide for building a model of the particular asset requirement for a specific purpose, which may be referred to herein as an Asset Requirement and Constraint Model (ARCM). Systems and methods further provide for building a model of the range of capabilities that a particular asset can provide, which may be referred to herein as an Asset Capabilities and Analysis Model (ACAM).

In summary, one aspect provides a system comprising: at least one processor; and a memory operatively connected to the at least one processor; wherein, responsive to execution of computer readable program code accessible to the at least one processor, the at least one processor is configured to: access asset information of at least one asset; accept at least one solution model having solution information; generate at least one requirements model based on the solution information; generate at least one asset model based on the asset information; and identify at least one matching asset by mapping the at least one requirements model with the at least one asset model.

Another aspect provides a method comprising: accessing asset information of at least one asset; accepting at least one solution model having solution information; generating at least one requirements model based on the solution information; generating at least one asset model based on the asset information; and identifying at least one matching asset by mapping the at least one requirements model with the at least one asset model.

A further aspect provides a computer program product comprising: a computer readable storage medium having computer readable program code embodied therewith, the computer readable program code comprising: computer readable program code configured to access asset information of at least one asset; computer readable program code configured to accept at least one solution model having solution information; computer readable program code configured to generate at least one requirements model based on the solution information; computer readable program code configured to generate at least one asset model based on the asset information; and computer readable program code configured to identify at least one matching asset by mapping the at least one requirements model with the at least one asset model.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
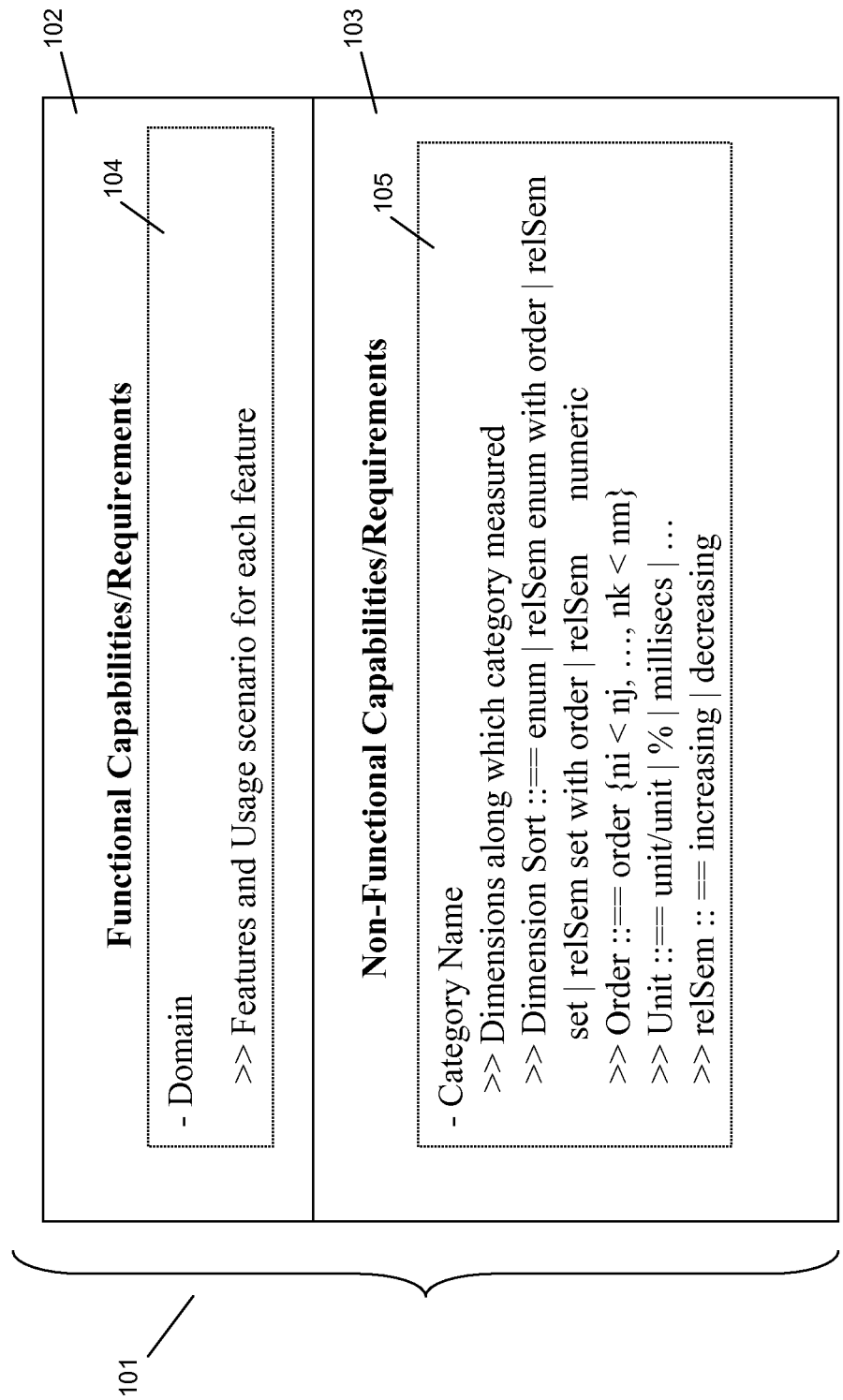
FIG. 1 illustrates an example of a generic structure of both the ARCM and ACAM models.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Asset analysis can be repetitive across customer engagements. However, earlier analysis details are hardly reused because the outcome of such exercises is not stored back in some type of repository as assets are generally considered in individualistic terms. For example, the result of an asset analysis, such as whether a particular asset was used or rejected for a particular purpose, does not get stored as an additional asset feature for future use. Another example of a potential asset feature involves the capturing of developer changes to an asset for use in a specific application. As such, a large amount of redundant asset searching, testing, and development occurs. Accordingly, a method to determine additional asset features and store them for use in future asset analysis is highly desirable.

The description now turns to the figures. The illustrated example embodiments will be best understood by reference to the figures. The following description is intended only by way of example and simply illustrates certain example embodiments representative of the invention, as claimed.

A software asset is an application or set of software elements that may be useful for a specific purpose, developing a new application, or enhancing an existing program. Non-limiting examples of assets include software applications, code, modules, or documentation. When a developer is attempting to solve a problem, he may use or incorporate an existing asset instead of developing an entirely new application. As such, assets and their associated information are often stored in asset repositories, making them available for searching, analysis and downloading by users.

A non-limiting example of an asset repository is a dashboard application that points to content residing on one or more asset repositories for different industries and service lines. The dashboard application helps to deliver a structured, solution-aligned view of the entire asset inventory, and may even provide pre-deploy and post-publish analysis of assets, however, without considering requirement matching or a fit gap analysis. In addition, a dashboard application according to this non-limiting example may also provide for the packaging and management of asset metada in the various repositories.

A non-limiting example of using an asset repository provides that a user may search the repository based upon project requirements and perform a fit gap analysis on those assets that appear to match the requirements. The fit gap analysis examines the features of the assets as compared with the project requirements in order to identify and minimize the gaps between what the project demands and what the assets are able to offer. Such asset identification and asset analysis is a lengthy and time consuming process. In addition, a user may be performing a redundant search and repeating the analysis of assets performed by another user because the details of previous analyses are unavailable.

Although asset fit gap analysis is an extremely useful development process, it does present several key challenges from several viewpoints. From a repository viewpoint, there is a need to have one consolidated view of assets as opposed to having to work with multiple asset collections and repositories. Support is also needed for a matrix view of assets and viewing asset capabilities across multiple industries. Another challenge arises because asset enablement material is not standardized or mandated. In addition, industry vector assets generally do not get reused, while technical assets (for example, logging, exception handling, and audit assets) are repeatedly used. From an asset analysis viewpoint, challenges arise because fit gap analyses are not available in the public domain. As such, teams are not aware of the availability of the assets, unless they do an extensive search or actually contact the architects who are aware of such assets. In addition, asset fit gap analysis is very subjective and person dependent. Furthermore, asset consumers don't have a download-ready analysis with respect to differentiating their selection over other related assets. From a requirement feedback viewpoint, there is presently no formal channel for capturing requirements for new assets or capabilities and passing this information back to the driver or creator of such assets.

Embodiments provide for sharing of asset analysis details in ontology based metadata, instead of unverified textual capturing of an asset architect's perspective. Further embodiments define a formalized mapping mechanism from a requirement/solution context that includes the details of asset customization in terms of new features and modified features with respect to a requirement context. In addition, aspects of the invention include support for incremental analysis that is compatible with multiple solution contexts over the period of time leading to repetitive/redundant effort. Another embodiment provides for hybrid community assets from multiple base assets on the reference to pre-defined solution contexts from different domains.

Aspects of the invention utilize requirements and capabilities models, including, but not limited to, Asset Requirement and Constraint Model (ARCM) and Asset Capabilities and Analysis Model (ACAM). Embodiments provide that the ARCM and ACAM models are built with the same metadata, but with different intents: ARCM specifies a particular asset requirement for a specific user, and ACAM specifies the range of capabilities that an asset can provide, which could meet several requirements.

Referring now to FIG. 1, therein is depicted a generic structure of both the ARCM and ACAM models according to an embodiment. More specifically, illustrated in FIG. 1 are non-limiting examples of the ARCM and ACAM details captured by certain embodiments. The model 101 may be comprised of both Functional Capabilities/Requirements 102 and Non-Functional Capabilities/Requirements 103 components. The Functional Capabilities/Requirements 102 component may be comprised of certain functional details 104. In the embodiment illustrated in FIG. 1, the functional details 104 consist of a domain element, which includes a feature and usage scenario for each feature. In addition, the Non-Functional Capabilities/Requirements 103 component may be comprised of certain non-functional details 105. As depicted in FIG. 1, non-functional details 105 may include, but are not limited to, a category name element, which includes dimension, dimension sort, order, unit, and relSem features. Embodiments provide for the mapping of ARCM with ACAM to identify the one or more assets relevant for a particular solution requirement. According to embodiments, a match is achieved when an ACAM whose functional and non-functional capabilities subsume the functional and non-functional requirements specified in the ARCM.

According to existing technology, ARCM generation is largely a manual task. Embodiments provide for automatically extracting requirements and generating a common ARCM. In addition, embodiments provide for searching asset capabilities and fit gap analysis through the filtered view of one or more generated common ACAM models. Furthermore, embodiments map ARCM with ACAM to identify the best suited asset for a solution of interest.

Embodiments provide for the creation of a consolidated and integrated model for the assets with respect to the opportunities and the associated analysis of the assets. As such, embodiments enable search centric capability for access fit gap analysis. In addition, embodiments enable formal capturing and matching capabilities that can be achieved with integrated engineering and search centric tooling. Thus, aspects of the invention establish a common metadata foundation for both ARCM and ACAM.

Figure 2:
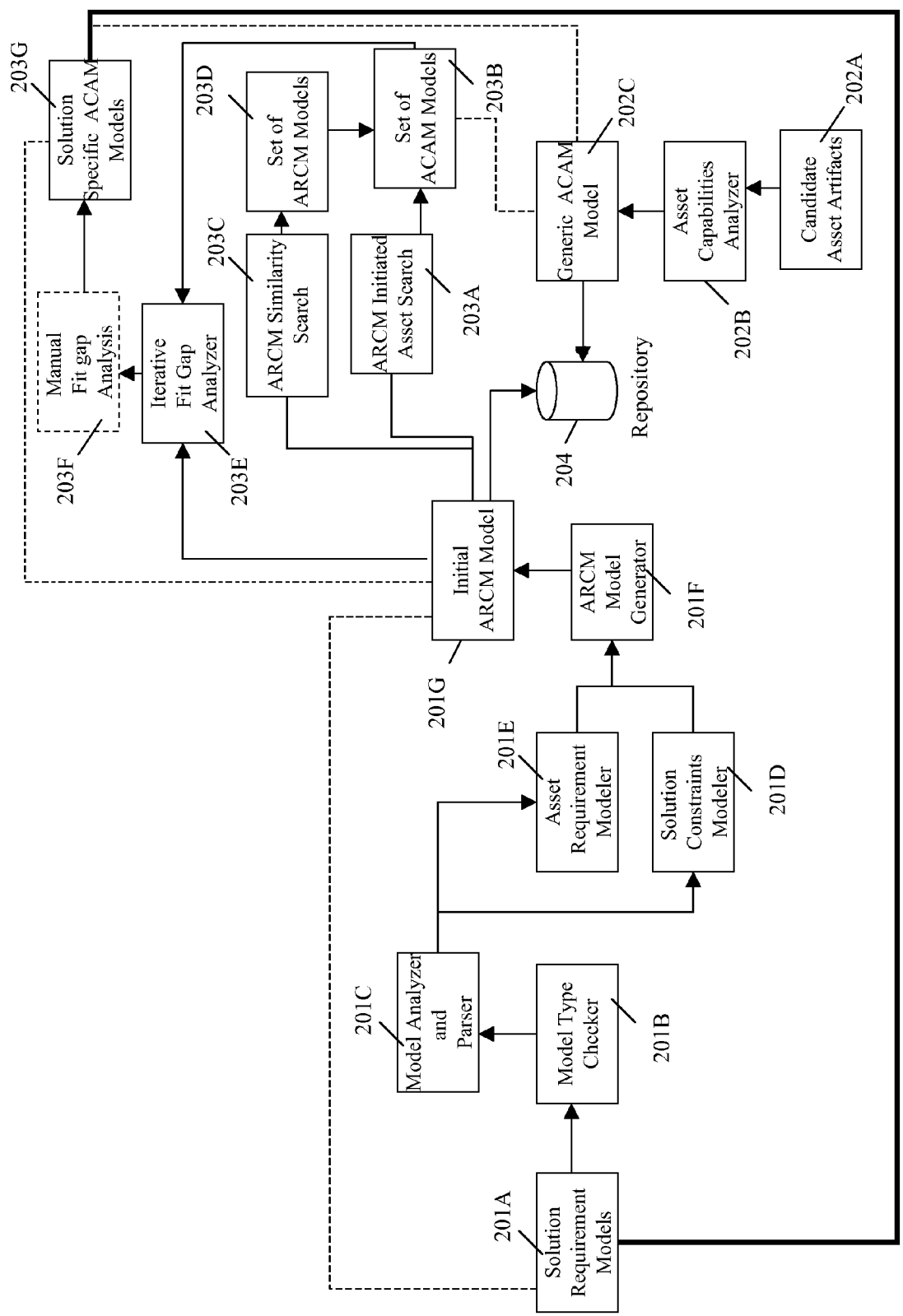
FIG. 2 illustrates an example embodiment of the invention.

Referring now to FIG. 2, therein is depicted an embodiment. According to the embodiment illustrated therein, aspects of the invention enable a requirement driven abstract asset model to be realized with one or more whole asset models, or one or more asset model parts, based on their fit gap analysis history. Each of the numbered sets (201A-G, 202A-C, and 203A-G) in FIG. 2 comprise an "input," "core action," and "output."

Set 201A-G in FIG. 2 depicts the construction of the initial ARCM model 201G from the solution requirement models 201A according to an embodiment. The inputs are the solution requirement models 201A, examples of which include, but are not limited to, formatted process models, component business models, goal requirements models, data models, and abstract design models. The core action involves detecting the model type, which is handled by the model type checker 201B. In addition, the model type checker 201B enables the model analyzer and parser 201C to design the constraints by the solution constraints modeler 201D and requirements through the asset requirement modeler 201E. The output is the initial ARCM model 201G, which is generated by the ARCM model generator 201F from the generic asset requirement modeler 201E and solution constraints modeler 201D outputs. The initial ARCM model 201G is specific to the solution requirement model 201A and will have active traceability links and may be stored in the repository 204. Subsequent versions solution requirement models 201A will have corresponding updates to the same initial ARCM model 201G.

Aspects of the invention as illustrated by series 201A-201G in FIG. 2 enable embodiments to mandate asset requirement identification and constraints modeling for all solution requirements. In addition, solution requirement models 201A with a poorly constructed initial ARCM model 201G can be highlighted for subsequent review and verification. Furthermore, embodiments provide that the initial ARCM model 201G may act as a good indicator for the quality of the solution requirement models 201A considered for subsequent development.

Set 202A-C in FIG. 2 depicts the construction of the ACAM initial model 202C from the candidate asset artifacts 202A according to an embodiment. The inputs are the candidate asset artifacts 202C, examples of which may include, but are not limited to, service design models, logical data models, low level object design models, and service description language files (WSDL, XML). The core action is analyzing core asset capabilities through the asset capabilities analyzer 202B in terms of provided functionalities, domain related insights, and identifying probable contextual information. The output from the asset capabilities analyzer is a generic, or abstract, ACAM model 202C. The generic ACAM model 202C is specific to the candidate asset artifacts 202A, and will have active traceability links with the submitted asset models. In addition, subsequent versions of the candidate asset artifacts 202A may provide corresponding updates to the same generic ACAM model 202C. The generic ACAM model may be stored in the repository 204.

Embodiments as illustrated by series 202A-C in FIG. 2 enable the prevention of redundant asset models, as the ACAM model can be compared with existing ACAM models for similarity in generic and abstracted asset capabilities in a given domain. In addition, embodiments provide that the ACAM model can contain an optional constraints aspect involving the usage of a solution. The constraints could be technical, legal (for example, intellectual properties issues), or functional. Furthermore, embodiments provide that the asset capabilities analyzer 202B, along with the capabilities, can be constructed as part of the generic ACAM model 202C. According to aspects of the invention, an ACAM can be a good indicator for the quality of assets submitted or consideration for subsequent development.

Set 203A-G in FIG. 2 depicts the construction of solution specific ACAM models 203G according to an embodiment. The input is the initial ARCM model 201G, which represents the asset requirement of the solution requirement models 201A. The core action is identifying a sizeable set of ACAM models 203B for iterative fit gap analysis 203E and, optionally, manual fit gap analysis 203F. According to embodiments, the iterative fit gap analysis 203E may involve matching and ranking the relevance of a given ACAM model with the ARCM model. The embodiment illustrated in FIG. 2 provides that the core action may involve four activities: (1) ARCM initiated asset search 203A, based on the initial ARCM model 201G, to select the set of ACAM models 203B; (2) ARCM similarity search 203C on the initial ARCM model 201G to identify the set of ARCM models 203D and the corresponding ACAM models 203B; (3) generation of the final set of ARCM models, which, embodiments provide, may be the union of the set of ARCM models 203D and the set of ACAM models 203B; and (4) initiate the iterative fit gap analyzer 203E with respect to the requirements and capabilities between the initial ARCM model 201G and the set of ACAM models 203B. The output of series 203A-203G in FIG. 2 is to generate the set of ACAM models 203G, specific to the different capabilities of the required ARCM model and which may be subjected to optional manual analysis, including, but not limited to, a manual fit gap analysis 203F. The solution specific ACAM models are specific to the solution requirements models 201A and the associated initial ARCM model 201G.

Embodiments as illustrated by series 202A-C in FIG. 2 provide that the content and strength of the ACAM models can quickly help in estimating the sizing, scheduling, and effort required for implementing a solution. In addition, embodiments provide that a solution requirement with a low content ACAM model can be revisited for subsequent improvement in terms of functional and constraint specification for better utilization of available assets. Furthermore, embodiments provide that the solution specific ACAM models 203G can lead to the importing of the associated assets into the solution modeling environment for rapid prototyping and development of the initial view of the solution design.

A banking industry fraud checking application according to an embodiment serves as a non-limiting example of a multi-analyzed re-usable asset. The model structure may include a FraudChecking functional capability, comprised of two FraudChecking functions, one for regular customers and one for high net worth customers. In addition, the model structure may include Performance and Security non-functional capabilities. Performance may be comprised of the following elements: (1) Dimension: implementation time, (2) Dimension Sort: decreasing numeric, (3) Unit: milliseconds. The Security capability may be comprised of: (1) Dimension: encryption strength, (2) Dimension Sort: increasing numeric, (3) Unit: KB. The non-limiting example provides that the ARCM specifies that FraudChecking for regular customers is: implementation time<100 milliseconds, encryption strength>=128 KB. In addition, the non-limiting example provides that the ACAM for assets are: (1) FraudChecking for high net worth customers: implementation time=150 milliseconds, encryption strength=256 KB; (2) FraudChecking for regular and high net worth customers: implementation time=90 millisecs and encryption strength=256 KB; and (3) FraudChecking for regular customers: implementation time=95 millisecs and encryption strength=512 KB. Thus, according to embodiments, the second and third assets described in this non-limiting example meet the ARCM requirements.

Embodiments enable the discovery of a set of multi-analyzed reusable assets to fulfill requirements of a software system, through metadata centric two-dimensional matching. In addition, embodiments define and capture solution specific centric ARCM models that are evolving and comparable in nature. Furthermore, aspects of the invention enable ARCM model based search and similarity matching with other ARCM models to detect pre-deployed and pre-analyzed assets for similar requirements. Moreover, embodiments provide for the discovery of ACAM models for the delta ARCM specific Asset Search/Analysis for unmatched requirements. As such, embodiments facilitate a faster estimation of solution development based on the asset availability space as described by the final set of ACAM models selected for a given ARCM.

Further embodiments provide for the storage of cumulative analysis details of assets in ontology based metadata across multiple solution requirement models. Embodiments also enable the discovery of redundant assets based on ACAM definition and fit gap analysis conducted on a given asset for similar solutions. In addition, aspects of the invention provide future solution enhancements, including, but not limited to, validating new or changed requirements with active association on actual assets, checking for constraints violations and related asset discovery. Embodiments thus support incremental analysis that is compatible with multiple solution contexts over a relevant period of time. This supported aspect of the invention prevents repetitive and redundant analytical exercises.

Contrary to existing technology, embodiments enable leveraging of pre-discovered and analyzed assets more efficiently. In addition, embodiments provide a governance mechanism for asset publishing by providing a ranking and rating mechanism that is based on actual usage and gap analytical insights associated with the asset model. Furthermore, embodiments provide an asset search mechanism that is based both on the asset metadata and asset usage metadata captured in a formalized structure. Moreover, embodiments facilitate the discovery of similar solution requirements models that help in understanding the implementation and estimation insights for trend and risk analysis with or without asset reuse opportunities. Embodiments thus allow for the avoidance of duplicate assets based on the context driven comparison of fit gap analysis models associated with assets.

Figure 3:
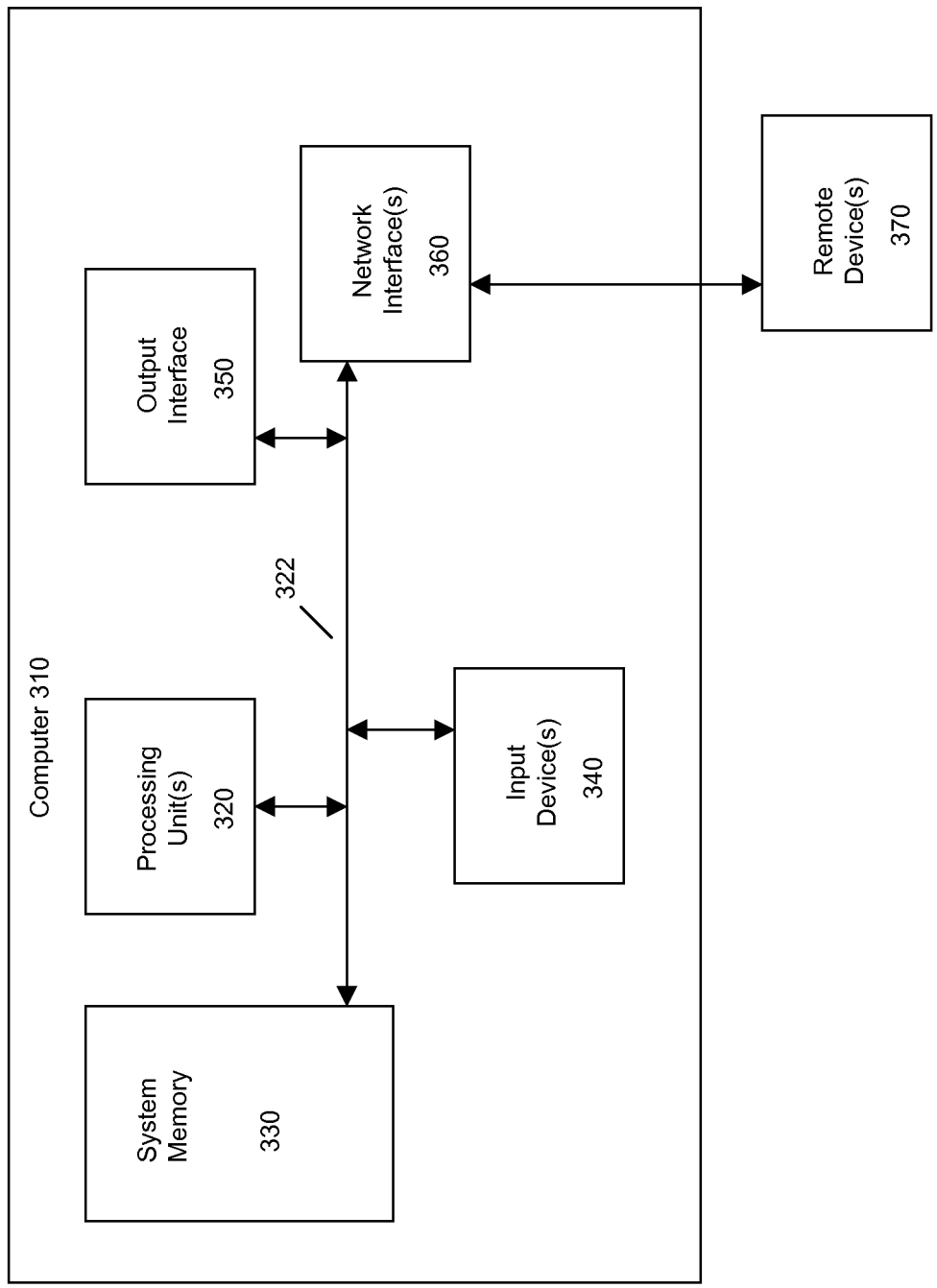
FIG. 3 illustrates an example computer system.

Referring to FIG. 3, it will be readily understood that certain embodiments can be implemented using any of a wide variety of devices or combinations of devices. An example device that may be used in implementing one or more embodiments includes a computing device in the form of a computer 310. Components of computer 310 may include, but are not limited to, a processing unit 320, a system memory 330, and a system bus 322 that couples various system components including the system memory 330 to the processing unit 320. The computer 310 may include or have access to a variety of computer readable media. The system memory 330 may include computer readable storage media in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 310 through input devices 340. A monitor or other type of device can also be connected to the system bus 322 via an interface, such as an output interface 350. In addition to a monitor, computers may also include other peripheral output devices. The computer 310 may operate in a networked or distributed environment using logical connections to one or more other remote computers or databases. The logical connections may include a network, such local area network (LAN) or a wide area network (WAN), but may also include other networks/buses, including telephony/voice channel connections.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor; and
   a memory operatively connected to the at least one processor;
   wherein, responsive to execution of computer readable program code accessible to the at least one processor, the at least one processor is configured to:
   access asset information of at least one asset;
   accept at least one solution model having solution information;
   generate at least one requirements model based on the solution information;
   generate at least one asset model based on the asset information; and
   identify at least one matching asset by mapping the at least one requirements model with the at least one asset model;
   wherein the solution information comprises:
   at least one asset requirement; and
   at least one solution constraint.

2. The system according to claim 1, wherein, responsive to execution of computer readable program code accessible to the at least one processor, the at least one processor is further configured to:
   capture matching details resulting from the identifying of the at least one matching asset;
   obtain customization details resulting from asset customizations; and
   store the matching details and the customization details as asset information.

3. The system according to claim 1, wherein the asset information comprises:
   at least one asset capability; and
   at least one asset analysis.

4. The system according to claim 3, wherein the at least one asset analysis comprise at least one fit gap analysis.

5. The system according to claim 1, wherein the asset information is stored in ontology based metadata.

6. The system according to claim 1, wherein the at least one solution model is selected from the group consisting of: formatted process model, component business model, goal requirement model, data model, and abstract design model.

7. The system according to claim 1, wherein the at least one asset model is selected from the group consisting of: service design model, logical data model, low level object design model, and service description language file.

8. The system according to claim 1, wherein the at least one requirements model further comprises:
   at least one requirements model functional requirement; and
   at least one requirements model non-functional requirement;
   wherein the one asset model further comprises:
   at least one asset model functional requirement; and
   at least one asset model non-functional requirement.

9. The system according to claim 8, wherein identifying at least one matching asset comprises:
   determining that the at least one asset model functional requirement and the at least one asset model non-functional requirement of an asset model subsume the at least one requirements model functional requirement and the at least one requirements model non-functional requirement of a requirements model.

10. A method comprising:
    accessing asset information of at least one asset;
    accepting at least one solution model having solution information;
    generating at least one requirements model based on the solution information,
    generating at least one asset model based on the asset information; and
    identifying at least one matching asset by mapping the at least one requirements model with the at least one asset model;
    wherein the solution information comprises:
    at least one asset requirement; and
    at least one solution constraint.

11. The method according to claim 10, further comprising:
    capturing matching details resulting from the identifying of the at least on matching asset;
    obtaining customization details resulting from asset customizations; and
    storing the matching details and the customization details as asset information.

12. The method according to claim 10, wherein the asset information comprises:
    at least one asset capability; and
    at least one asset analysis.

13. The method according to claim 12, wherein the at least one asset analysis comprise at least one fit gap analysis.

14. The method according to claim 10, wherein the asset information is stored in ontology based metadata.

15. The method according to claim 10, wherein the at least one solution model is selected from the group consisting of: formatted process model, component business model, goal requirement model, data model, and abstract design model.

16. The method according to claim 10, wherein the at least one asset model is selected from the group consisting of: service design model, logical data model, low level object design model, and service description language file.

17. The method according to claim 10, wherein the at least one requirements model further comprises:

at least one requirements model functional requirement; and at least one requirements model non-functional requirement;

wherein the at least one asset model further comprises:

at least one asset model functional requirement; and at least one asset model non-functional requirement.

18. A computer program product comprising:

a computer readable storage medium having computer readable program code embodied therewith, the computer readable program code comprising:

computer readable program code configured to access asset information of at least one asset;

computer readable program code configured to accept at least one solution model having solution information;

computer readable program code configured to generate at least one requirements model based on the solution information;

computer readable program code configured to generate at least one asset model based on the asset information; and computer readable program code configured to identify at least one matching asset by mapping the at least one requirements model with the at least one asset models;

wherein the solution information comprises:

at least one asset requirement; and at least one solution constraint.

* * * * *